United States Patent [19]

Sudo

[11] Patent Number: 4,579,000
[45] Date of Patent: Apr. 1, 1986

[54] APPARATUS FOR DETECTING ULTRASONIC VIBRATION

[75] Inventor: Naohiko Sudo, Kawasaki, Japan

[73] Assignee: Sonotec Co., Ltd., Kanagawa, Japan

[21] Appl. No.: 623,181

[22] Filed: Jun. 21, 1984

[30] Foreign Application Priority Data

Jul. 8, 1983 [JP] Japan .............................. 58-123440

[51] Int. Cl.$^4$ ............................................ G01H 11/02
[52] U.S. Cl. ........................................ 73/654; 73/649;
73/652; 73/661; 181/107; 324/208; 310/325
[58] Field of Search ............... 181/107, 120; 310/325,
310/185; 73/649, 651, 652, 654, 661, 665;
324/208

[56] References Cited

U.S. PATENT DOCUMENTS

| | | | |
|---|---|---|---|
| 3,633,053 | 1/1972 | Peters | 73/654 |
| 3,918,298 | 11/1975 | Petersen et al. | 73/665 |
| 4,034,827 | 7/1977 | Leerskov, Jr. et al. | 181/107 |
| 4,173,749 | 11/1979 | Corkhill | 357/190 |
| 4,301,887 | 11/1981 | Fiske, Jr. | 73/652 |
| 4,361,045 | 11/1982 | Iwasaki | 73/654 |

*Primary Examiner*—Howard A. Birmiel
*Attorney, Agent, or Firm*—Koda and Androlia

[57] ABSTRACT

This invention is an apparatus for detecting the vibration of a Langevin type electrostrictive ultrasonic vibrator comprising a system made up of an iron core, a coil and a magnet surrounding but not connected to a magnetic projection attached to the rear end of the vibrator. The vibration of the magnetic projection is detected by the system surrounding it and the resulting induced voltage is fed back to a control to maintain the vibration at the desired resonant frequency.

3 Claims, 1 Drawing Figure

APPARATUS FOR DETECTING ULTRASONIC VIBRATION

BACKGROUND OF THE INVENTION

1. Field of the Invention

This invention relates to an apparatus for detecting ultrasonic vibration, and more particularly to an apparatus comprising an iron core, a coil and a magnet surrounding a magnetic projection attached to an electrostrictive Langevin type ultrasonic vibration for detecting and feeding back voltage changes induced by the vibration of the magnetic projection and thus controlling the frequency of the vibrator.

2. Description of the Prior Art

As is well known in the art, there are two types of ultrasonic vibrators: (1) the magnetostrictive type which has the defect of generating a large amount of heat during operation and consequently needs cooling; and (2) the more prevalent electrostrictive type, among which the fixed bolt Langevin configuration is mostly used owing to its high efficiency and durability.

For maximum efficiency an ultrasonic vibrator should operate exactly at its resonant frequency, but the actual operating frequency deviates from resonance due to changes in load and working temperature. Therefore, one must detect the actual deviation from the resonant frequency and feed it back for control. To this end a pickup device with a detecting sensor, such as a ceramic element, has been attached to the vibrator to detect its frequency and restore it to the resonant frequency.

However, in such a device the measured value of the detected frequency lies below its true value because of the temperature rise during operation. This leads to a continual upward adjustment of the frequency until the excessive frequency ultimately destroys the apparatus. Two defects are apparent: the need for cooling, and the danger of the sensor itself being vibrated off or destroyed. There is thus a need for an improved detector which has none of these defects.

BRIEF SUMMARY OF THE INVENTION

Accordingly, it is the primary object of this invention to provide an improved detection apparatus for ultrasonic vibration which is not disturbed by vibration or temperature increase. Frequency is accurately detected with the system of this invention which comprises an iron core, a coil and a magnet surrounding a magnetic projection attached to the vibrator.

Further objects and characteristics of this invention will be made clear by the following description and attached drawing.

In keeping with the principles of this invention, the objects are achieved by the unique structure of this invention in which a magnetic projection which vibrates synchronously with the vibrator is integral with the vibrator at the end opposite from the radiating horn of a Langevin type electrostrictive ultrasonic vibrator. Surrounding but not connected to the magnetic projection is a detection system comprising an iron core, a coil and a magnet. The voltage induced therein by the vibration of the projection is fed back to control the vibration at the desired resonant frequency. This invention accomplishes the control of vibration without any error or problem, since the detection system is safely removed from any temperature, vibration or friction of the vibrator. Thus this invention provides an ultrasonic vibration detecting apparatus of superior construction and integrity.

BRIEF DESCRIPTION OF THE DRAWING

For the purpose of illustration, a typical embodiment of the invention is shown in the accompanying drawing in which.

DETAILED DESCRIPTION OF THE INVENTION

Figure 1:
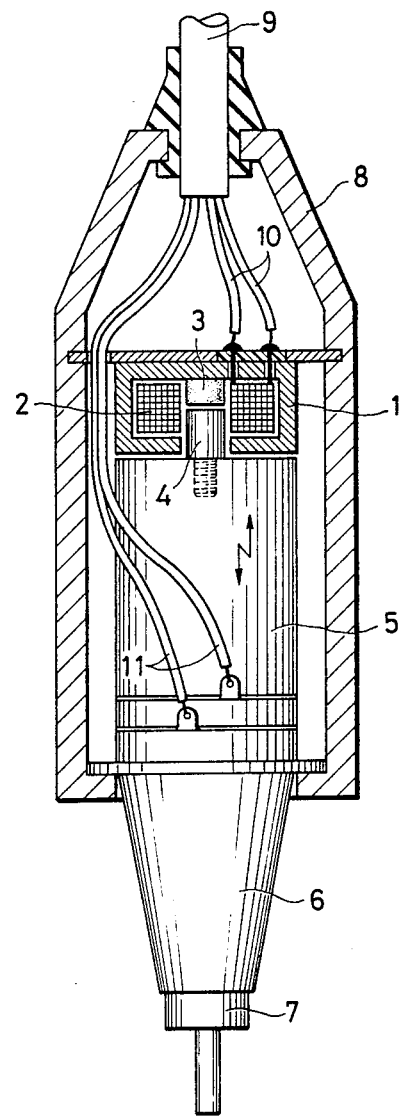
FIG. 1 is a schematic sectional view of the apparatus for detecting ultrasonic vibration of this invention.

As shown in FIG. 1, in a case 8 there is installed a Langevin type ultrasonic vibrator 5 which is operated electrostrictively by lead wire 9 and vibrator connection wires 11. The vibration radiates through a horn 6 with attachment 7 to which may be attached cleaners, machine tools, plastic welders and so forth to intensify and strengthen the amplitude of the vibration. At the end opposite from the horn there is normally provided a projection such as a nut, or bolt with the nut, made of stainless steel, aluminum or titanium which are nonmagnetic materials.

According to this invention, the projection 4 of the nut or bolt with nut is made of a magnetic material such as iron. Surrounding the projection 4 but not connected to it are an iron core 1, a coil 2 and a magnet 3 which form a detection system. The vibration of the vibrator 5 causes the integral projection 4 to vibrate synchronously. However, the detection system comprising core 1, coil 2 and magnet 3 is not connected to vibrator 5 and thus is not affected by temperature, vibration, friction and so forth. Thus the resulting voltage is safely induced in the said detection system of coil 2 together with core 1 and magnet 3 and is fed back through lead wires 10 to frequency control. Accordingly, the electrostrictive ultrasonic vibration can be kept at the desired resonant frequency using the detection apparatus of this invention.

In the detection apparatus for ultrasonic vibration of this invention, the vibration of the vibrator which simultaneously vibrates the magnetic projection at the end of the vibrator is detected and fed back by the detection system comprising an iron core 1, a coil 2 and a magnet 3 surrounding but not connected to said magnetic projection of the vibrator to keep the ultrasonic vibration at the desired resonant frequency.

From the foregoing description it can be seen that by reason of the isolation of the detecting apparatus from the vibrating magnetic projection temperature elevation, vibration and friction of the vibrator will not disturb the detecting apparatus. Therefore, the detecting frequency is accurate and precise without any problem, and, moreover, the apparatus of the this invention is designed to enhance productivity and mass production owing to its simple structure and low production cost.

It should be understood that the present disclosure is for the purpose of illustration only and that this invention includes all modifications and equivalents which fall within the scope of the appended claims.

I claim:

1. In a Langevin type electrostrictive ultrasonic vibrator with an ultrasonic projecting horn: an apparatus for detecting ultrasonic vibration comprising a system including an iron core having a coil connected to a vibrating control device and a magnet which reacts and effects the circuit with said iron core and coil, said system surrounding but being isolated from a projection made of a magnetic material which vibrates integrally with said vibrator at the end opposite from the ultrasonic projecting horn and which projects into a center of said coil and said system further being isolated from said vibrator, resulting in induced voltage in the coil excited by vibration of said magnetic projection being detected and fed back to a vibration control device to keep the vibration at the desired resonant frequency.

2. An apparatus for detecting ultrasonic vibration according to claim 1, wherein said projection is made of steel.

3. In a Langevin type electrostrictive ultrasonic vibrator with an ultrasonic projecting horn: a method for detecting ultrasonic vibration in which a system comprising an iron core having a coil connected to a vibration control device and a reacting magnet creating a circuit with said iron core and coil surrounding but isolated from a projection made of a magnetic substance vibrating integrally with the vibrator placed at the end of the vibrator opposite from the ultrasonic projecting horn and which projects into said coil, the system detecting an induced voltage excited in said system by the vibration and feeding back the induced voltage to a vibration control device to keep the vibration at the desired resonant frequency.

* * * * *